United States Patent [19]

Tseng et al.

[11] 3,990,776

[45] Nov. 9, 1976

[54] MAGNETO-OPTICAL DIGITAL LIGHT DEFLECTOR

[75] Inventors: Samuel C.-C. Tseng, Yorktown Heights; Axel R. Reisinger, Mohegan Lake, both of N.Y.

[73] Assignee: International Business Machines Corporation, Armonk, N.Y.

[22] Filed: June 17, 1975

[21] Appl. No.: 587,569

[52] U.S. Cl. .......................... 350/96 C; 350/96 WG
[51] Int. Cl.² ............................................. G02B 5/14
[58] Field of Search ...................... 350/96 WG, 96 C

[56] References Cited
UNITED STATES PATENTS

| | | | |
|---|---|---|---|
| 3,795,433 | 3/1974 | Channin | 350/96 WG |
| 3,870,397 | 3/1975 | Dillon, Jr. et al. | 350/96 WG |

OTHER PUBLICATIONS

"Mode Conversion in Magneto–Optic Waveguides Subjected to a Periodic Permalloy Structure," by Tseng et al., App. Phys. Letters, Vol. 24, No. 6, Mar. 1974.

*Primary Examiner*—John K. Corbin
*Assistant Examiner*—Stewart Levy
*Attorney, Agent, or Firm*—Pollock, Vande Sande & Priddy

[57] ABSTRACT

A switching device for switching an optical beam between first and second outputs each associated with first and second paths in a thin-film optical wave guide supported on a substrate. Switching occurs by reason of mode conversion in a first or second path as determined by the direction of a variable magnetic field. A common optical path is defined, in said wave guide, by a first optical coupler, for coupling an optical beam into or out of said wave guide, and a beam splitter. First and second optical paths are defined, in the same wave guide, between the beam splitter and second and third couplers each co-linear with said beam splitter. At least a portion of each of said first and second optical paths include means for periodically varying the magnetization in said path. The wave guide is subjected to a d.c. magnetic field in the plane of the wave guide and at an angle with respect to both said first and second paths. Preferably the first and second paths are perpendicular and the d.c. field makes a 45° angle with each of said paths. A variable magnetic field is superimposed on the d.c. field and is directed perpendicular to the d.c. field, in the plane of the wave guide. The variable magnetic field may be energized in one of two senses, 180° apart, each, of course, perpendicular to the d.c. field direction. Analyzers may be located adjacent the second and third couplers to comprise the outputs referred to above.

13 Claims, 9 Drawing Figures

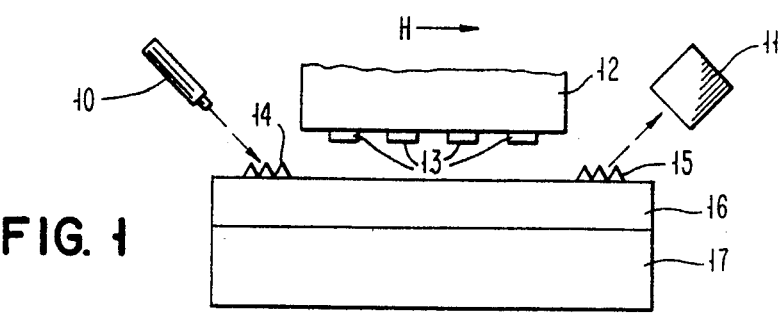
FIG. 1
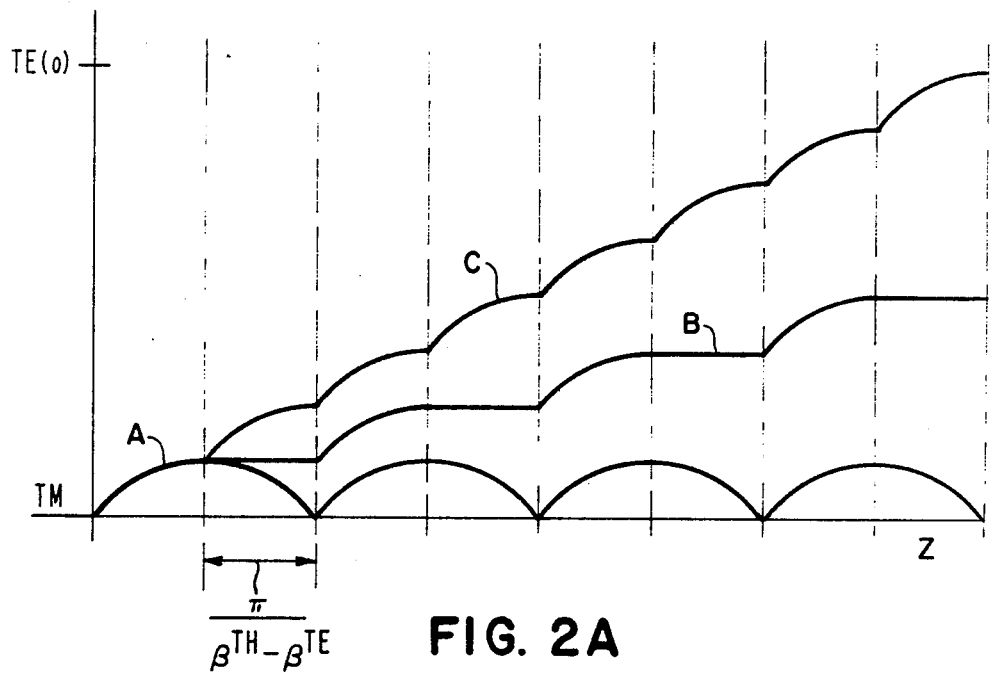
FIG. 2A
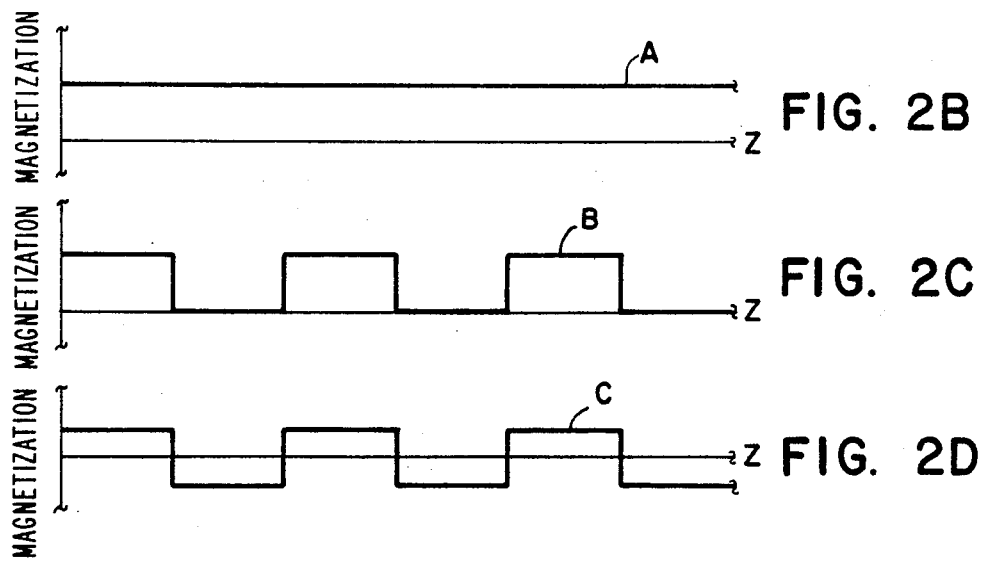
FIG. 2B
FIG. 2C
FIG. 2D

MAGNETO-OPTICAL DIGITAL LIGHT DEFLECTOR

FIELD OF THE INVENTION

The present invention relates to a magneto-optical switching device for switching an optical beam in response to magnetic field variations. In particular, the switching device of the present invention relies upon selective mode conversion of the optical beam.

BACKGROUND OF THE INVENTION

With the advent of the possibilities of employing optical beams as data links or information carriers, a need has arisen for devices capable of switching or deflecting optical beam for such purposes as multiplexing and demultiplexing. A variety of devices are known in the prior art for switching or deflecting optical beams such as Heidrich et al U.S. Pat. No. 3,736,045. In addition, the prior art is aware of, and has employed, the Faraday rotation or mode conversion to switch or deflect optical beams, see Pearson et al U.S. Pat. No. 3,512,867. This patent discloses an optical switching device which relies upon the Faraday rotation effect. However, the device disclosed in that patent is essentially a bulk wave device, i.e., it is relatively thick. For many reasons it is recognized that a thin-film switching device also employing Faraday rotation is preferable.

Both Tien et al. (Switching and Modulation of Light in Magneto-Optic Wave Guides of Garnet Films in Applied Physics Letter Vol. 21 No. 8, pages 394–96, Oct. 15, 1972) and Tseng et al. (Mode Conversion in Magneto-Optic Wave Guides Subjected to a Periodic Permalloy Structure, Applied Physics Letter Vol. 24 No. 6, pages 265–67, Mar. 15, 1974) recognize that mode conversion in thin-film devices is severely hampered by the differences in phase velocities for the transverse electric and transverse magnetic polarized components. Each of the articles, however, suggests increasing the mode conversion efficiency in thin-film wave guides by providing for magnetization of the optical path which is periodically reversed as a function of distance along the wave guide. Tien et al employs a serpentine patterned current conductor associated with the wave guide to generate magnetization which is periodically reversed. Tseng et al employs a periodic permalloy pattern which, in a unidirectional magnetic field provides for periodic reversal of the magnetization in the optical path.

Notwithstanding the foregoing, however, neither of these references teach a simple and effective switching device employing the periodically reversed magnetization along the optical path. Tien does mention that for switching purposes two serpentine circuits should be used, one to maximize mode conversion, when desired, and the other to inhibit conversion, when such conversion is not desired. This arrangement of two serpentine circuits will be required for each optical path and thus, in the minimum configuration necessary for a multiplexer or demultiplexer, a total of four such serpentine circuits are required along with the attendant apparatus to energize and deenergize the circuits at the proper times. Although such a solution appears to be operative, it has a disadvantage of requiring unnecessary apparatus and the current conductors closely associated with the wave guides can cause undesirable heating of the wave guide at operating current levels.

SUMMARY OF THE INVENTION

It is therefore one object of the present invention to provide a magneto-optical switching device which is capable of being employed as a multiplexer or demultiplexer which is simplier than that proposed in the prior art.

It is another object of the present invention to provide such a magneto-optical switching device which employs Faraday rotation of polarization in a thin-film guide along with periodic variations in the magnetization along the optical path to increase the conversion efficiency.

It is still another object of the present invention to provide such a switching device which is symmetrical in that it can be used either as a multiplexer or demultiplexer.

Still other further objects and advantages of the present invention will become apparent from a review of the detailed description of the invention which follows.

Briefly, the foregoing and other objects of the present invention are achieved by providing a switching device which allows an optical beam to pass to a first or a second output in response to variations of the magnetic field to whch the device is subjected. The device comprises a thin-film optical wave guide whose major dimensions lie in a plane, which wave guide is supported on a substrate and which includes a common path for accepting an optical beam (when acting as a demultiplexer — this same path provides the output when the device operates as a multiplexer). Means are provided for establishing a pair of optical paths each associated with a different one of the outputs and each of which communicates with the common optical path. Means are provided to establish a periodic variation of the magnetization along both of the optical paths. A pair of magnetic fields are provided: a first magnetic field being a direct current magnetic field in the plane of the wave guide and directed at an angle to both of said pair of optical paths; and second magnetic field being a variable magnetic field, also in the plane of the wave guide, directed perpendicular to the direct current magnetic field. When the variable magnetic field is present in one sense, polarization conversion occurs in one of the pair of optical paths and thus an output is provided therefrom. At the same time, however, the total magnetic field associated with the second path is transverse to the path, thus inhibiting mode conversion. By reversing the sense of the variable magnetic field, the magnetization in the first optical path is transverse thereto thus inhibiting mode conversion and preventing an output from the first optical path. At the same time, however, magnetization is directed longitudinally of the second path, thus allowing mode conversion and producing an output therefrom.

When operated as described above the switching device is capable of demultiplexing, that is accepting an optical beam which may carry information and directing parts of the input optical beam out one optical path, and other parts of the input optical beam out a second optical path.

Since the switching device is symmetrical, it can also be employed as a multiplexer. Thus, an optical beam provided at a first optical path may be allowed to couple through to the common optical path. At the same time, any optical beam provided at the second optical is inhibited from being coupled to the common optical path. By reversing the sense of the variable magnetic field the second optical path is allowed to pass an optical beam to the common optical path while at the same time the first optical path is inhibited from passing any optical beam to the common optical path. Those of ordinary skill in the art will readily perceive that the switching device of this invention may be cascaded with other identical devices to increase the multiplexing or demultiplexing capacity.

BRIEF DESCRIPTION OF THE DRAWINGS

Specific embodiments of the present invention will be described in the following portions of the specification which specification refers to the drawings appended hereto in which like reference characters identify identical apparatus and in which;

FIG. 1 is a cross section of the Tseng experimental apparatus to illustrate the mode conversion process;

FIG. 2A is a plot of mode intensity versus distance along the wave guide for three different cases of magnetization and FIGS. 2B, 2C and 2D, illustrate the respective magnetizations;

DETAILED DESCRIPTION OF THE INVENTION

Figure 3:
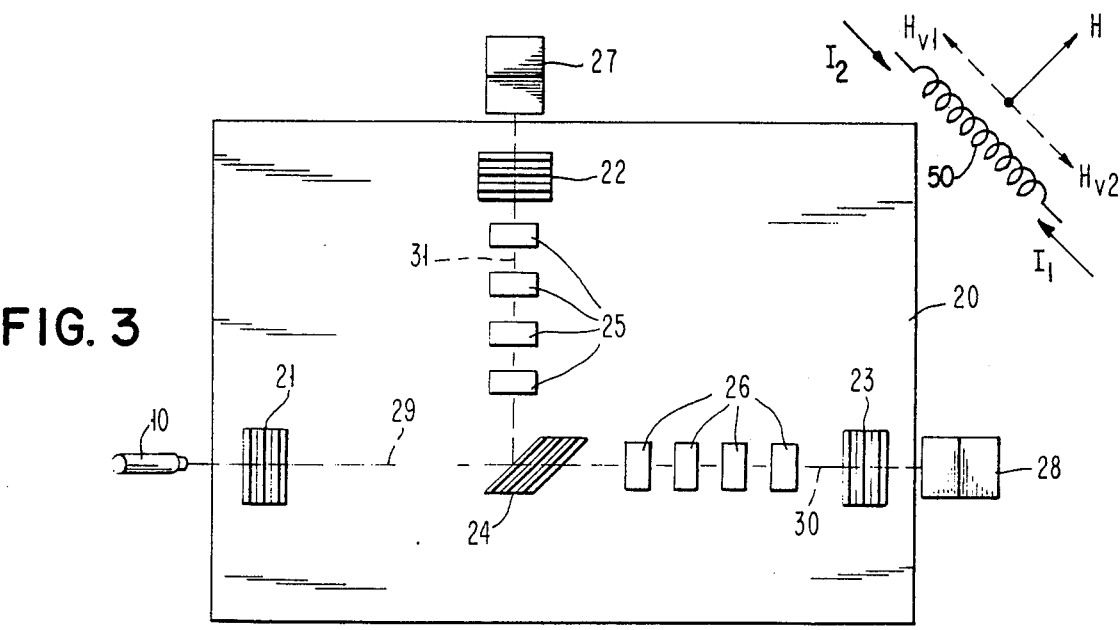
FIG. 3 is a plan view of the switch of the invention.

Optical waves propagating in a magnetic thin-film wave guide are a mixture of TE and TM modes. For an input of a pure TE mode propagated in such a wave guide, an analyzer placed in the output portion of the wave guide sees a TM mode. If the magnetization of the thin-film is in the plane of the wave guide and along the direction of the propagation, the amplitude of the mode conversion at a distance Z from the light input is expressed as $$\frac{TM(z)}{TE(o)} = \frac{zK}{B^{TE} - B^{TM}} \text{SIN} \left| \frac{(B^{TM} - B^{TE})}{2} xz \right|$$

where K is the coupling strength and its sign can be changed by changing the direction of magnetization in the thin-film wave guide.

Due to the inherent difference in the propagation constants, that is the difference between $B_{TM}$ and $B_{TE}$, the conversion efficiency is usually small. However, as explained by Tseng et al, if along the path of light propagation the magnetization of the film is periodically reversed in direction at every distance of $$z = \frac{\pi}{(B^{TM} - B^{TE})}$$

then the mode conversion will accumulate.

A similar effect, although not as efficient, can be provided if the magnetization along the optical path is periodically reduced to zero. In both cases the mode conversion will accumulate although in the former case it will accumulate at a more rapid rate and hence will provide more efficient conversion. Such mode conversion takes place when the magnetization is along the direction of light propagation. Mode conversion cannot take place if the magnetization is transverse to the direction of light propagation.

To illustrate the foregoing FIG. 1 illustrates the apparatus employed by Tseng et al in the experiment reported in the Applied Physics Paper, supra. In particular, the thin-film optical wave guide 16 is supported on a substrate 17. A pair of light couplers 14 and 15 are provided for coupling light into and out of the wave guide 16. Adjacent to wave guide 16 a wafer 12 has applied to it a pattern of permalloy bars 13 whose width and spacing provide for reversals in magnetization along the optical path in the presence of an applied magnetic field H illustrated in FIG. 1. An optical beam is coupled to the wave guide 16 through a polarizer 10 and an output optical beam is provided from the wave guide 16 through an analyzer 11. If we assume the polarizer 10 results in a pure TE optical beam being coupled into the wave guide 16 then the curves illustrated in FIG. 2 show the intensity of the TM wave as a function of distance in the wave guide 16. In particular, in the absence of the permalloy pattern curve A shows that the conversion from TE to TM is periodic and, as a function of distance increases at the input end to some maximum value and then decreases again to zero, with this pattern repeated at periodic intervals. With the addition of the permalloy pattern 13, which provides for a periodic reversals in the direction of magnetization, curve C illustrates how the mode conversion, from TE to TM, accumulates as a function of distance through the wave guide. Curve B illustrates a slightly different arrangement in which mode conversion accumulates, but at a lower rate than that provided by the apparatus of FIG. 1.

FIG. 3 illustrates the apparatus of the present invention which employs the foregoing principles to provide a magneto-optical switching device. In particular, FIG. 3 shows an optical wave guide 20, deposited on a substrate, not shown. As an example, the substrate may comprise a GGG wafer and the magnetic thin-film can be a substitute yittrium iron garnet. By proper choice of the lattice constant of the substrate and the magnetic film we induce a magnetic anisotropy with the easy axis parallel to a plane which includes the major dimensions of the thin-film wave guide. As a result, the magnetization can be rotated rather freely within the plane of the film by a small magnetic field (on the order of one oersted). Alternatively, the thin-film can be epitaxially grown on the substrate. A plurality of grating couplers 21, 22 and 23 are fabricated on top of the thin-film for coupling an optical beam into and out of the wave guide 20. A beam splitter 24 is also fabricated in the wave guide which may be a Bragg's diffraction grating which will serve to split the optical beam from coupler 21, into two paths, each one directed to a different one of couplers 22 and 23. Thus, a common optical path 29 is provided beween coupler 21 and beam splitter 24, and a first and second optical path is provided; a first path 22 between the beam splitter 24 and the coupler 22, and a second path 30, between the beam splitter 24 and the coupler 23. The couplers and beam splitter can be fabricated using well known techniques, such as by employing a photoresist having a pattern optically transferred from a mask.

A polarizer (not shown) may be employed to ensure that the optical beam entering the common optical path 29 (through coupler 21) is polarized in a particular orientation, transverse electric or transverse magnetic, as desired. A pair of analyzers 27 and 28 may also be employed each adjacent a different one of the couplers 22 and 23 for limiting the output of the switch to that portion of the optical beam whose polarization has been converted during the transmission of the beam through the switch.

As the Tseng article makes clear, for efficient polarization conversion, the magnetization in the direction of beam propagation should be periodically reversed (or at least reduced to zero as explained hereinafter). The period of magnetization reversals depends upon the difference between the propagation constants for transverse electric and transverse magnetic polarized wave. One method of ensuring such periodical reversing of magnetization is, as disclosed in the Tseng article, to provide a periodic permalloy pattern such as permalloy bars 25 and 26 located adjacent optical paths 31 and 30, respectively, Although the referred to Tseng article indicates that the permalloy can be provided on a substrate located adjacent to the wave guide, it is also within the scope of our invention to deposit the permalloy on the wave guide surface itself.

In order to provide the necessary magnetic field to cause the polarization mode conversion to take place, a pair of magnetic fields is provided. As is shown in FIG. 3, a magnetic field H is provided in the plane of the wave guide and at an angle to the first and second optical paths 31 and 30. This field may be a d.c. field, i.e., a field which is constant in direction and magnitude. In addition to the foregoing field H, a variable magnetic field $H_v$ is also provided, also in the plane of the wave guide, but directed perpendicular to the d.c. field H. More particularly, the variable magnetic field of $H_v$ can be directed either as shown at $H_{v1}$ or as shown at $H_{v2}$. Those with ordinary skill in the art will understand that a single coil such as coil 50 will generate either of these fields depending upon the direction of current $I_1$ to generate $H_{v1}$ or $I_2$ to $H_{v2}$ through the coil.

The resultant magnetic field applied to the switching device, wherein $H_{v1}$ is present, and $H_{v2}$ is absent, will be directed longitudinally of the optical path 31 and transversely of the optical path 30. Under these conditions, efficient mode conversion takes place in optical path 31 and such mode conversion is inhibited in optical path 30. Conversely, when $H_{v2}$ is present and $H_{v1}$ is absent, the total magnetic field effective at the switching device will be directed longitudinally of optical path 30 and transversely of optical path 31. Consequently, efficient mode conversion takes place in optical path 30, and such mode conversion is inhibited in optical path 31. The magnetic field can be produced by a small permanent magnet or the equivalent.

When an optical beam is coupled into wave guide 20 through coupler 21 it will traverse optical path 29 and, by reason of the beam splitter 24 such beam will traverse optical paths 31 and 30. Assuming that the polarizer (not shown) introduced pure TE at coupler 21, and that analyzers 27 and 28 will only pass TM, then depending upon the direction of the variable magnetic field either analyzer 27 or analyzer 28 (but not both) will produce a light output. More particularly, if the variable magnetic field is $H_{v1}$ then analyzer 27 will produce a light output and analyzer 28 will not. Conversely, if the magnetic field is directed at $H_{v2}$ then analyzer 28 will produce a light output and analyzer 27 will not.

Those of ordinary skill in the art will understand that the d.c. field H must be directed at an angle to both optical paths 31 and 30 to be effective. Furthermore, preferably the optical paths 30 and 31 are mutually perpendicular, or substantially so. Notwithstanding the foregoing, however, the angle that the field H makes with optical paths 30 and 31 can be varied depending upon the circumstances. Preferably, however, the field H makes a 45 degree angle with each of optical paths 30 and 31. In this particular case, the variable magnetic field can be symmetrical, that is the intensity $H_{v1}$ equals the intensity of $H_{v2}$. If the angle the field H makes with optical paths 30 and 31 is not equal then it may be necessary to provide $H_{v1} \neq H_{v2}$, in amplitude.

Figure 4A:
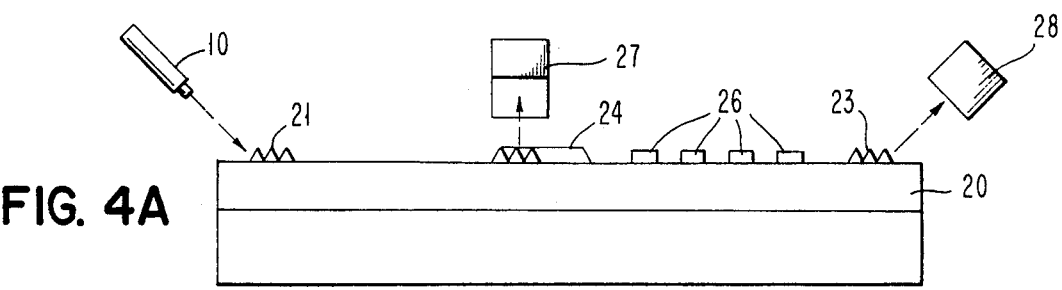
FIGS. 4A, 4B and 4C and respectively cross-sections of three different embodiments of the switch of the invention.
Figure 4B:
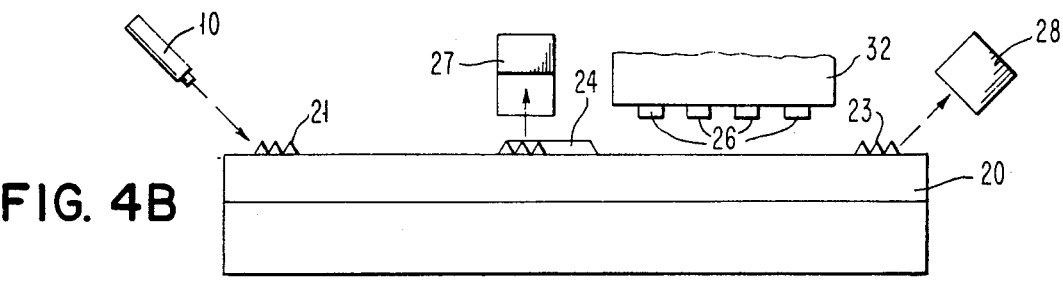

As is mentioned above the means for periodically varying the magnetization along both of the optical paths, as illustrated in FIG. 3, may comprise a plurality of permalloy bars 25 and 26, for instance. FIGS. 4A and 4B are cross sections taken through the optical paths 29 and 30 illustrating two different embodiments. These embodiments differ mainly in the relationship between the permalloy structure 26 for example, and wave guide 20. In FIG. 4A the wave guide 20 is shown with respect to the input coupler 21, beam splitter 24 and output coupler 23. As shown in FIG. 4A the permalloy pattern 26 comprises a plurality of permalloy "islands" deposited atop the wave guide 20. The periodicity of the permalloy bars, that is the spacing between different bars and the width of the bars is chosen in accordance with the specifications of the Tseng article. In particular, the longitudinal magnetic field should be reversed every $\pi/\Delta B$, when $\Delta B = B_{TM} - B_{TE}$. As disclosed in the aforementioned Tseng article the deposition can take the form of sputtering.

FIG. 4B is a cross section taken on the same line as is FIG. 4A but it illustrates a different embodiment. In this embodiment the permalloy pattern 26 is not deposited on the wave guide 20 but is instead deposited on another substrate 32. The dimension and spacing of the permalloy bars 26 (shown in FIG. 4B) can be identical to those specified with respect to FIG. 4A. In this embodiment the substrate 32 is allowed to rest (through the permalloy bar 26) on the wave guide 20.

Figure 4C:
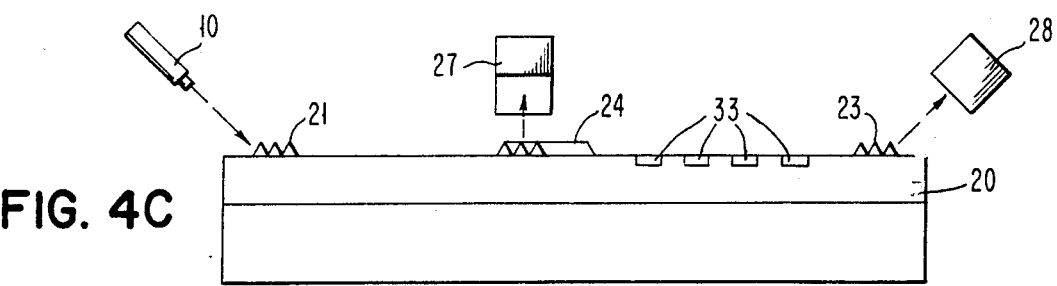

FIG. 4C is a cross section of still further embodiment which is represented by the plan view of FIG. 3. This embodiment is identical to FIG. 4A except that the permalloy bar 26 has been omitted and instead the plurality of small islands 33 have been created in the wave guide structure itself.

To create these island, a silicon (or other non-magnetic material) pattern, with the same periodicity and widths is deposited on the surface of the wave guide. Subsequent to this deposition step, the silicon is diffused into the wave guide material such as by heating. Subsequent to the diffusion operation, the surface of the wave guide can then be cleaned. The resulting structure, as shown in FIG. 4C, comprises a periodic repetition of magnetic material, outside the diffused silicon area 33, interspersed with non-magnetic material, i.e., the diffused silicon. As a result, when a longitudinal magnetic field is applied, such as by the co-joint actions of the d.c. field H and the variable magnetic field $H_v$, longitudinal magnetization will result in the areas outside of the silicon diffused areas, and the magnetization will not be present in the silicon diffused areas. For those areas in which longitudinal magnetization is present, mode conversion, from TE to TM, for instance, will take place. In those areas where the magnetization is absent, no mode conversion will take place. Thus, a graphical plot of mode intensity versus distance through the wave guide, for the structure illustrated in FIG. 4C, will appear as curve B (see FIG. 2). Although this conversion process is not as efficient as the structure which results in periodic magnetization reversals (see curve C) this stills provides the cumulative conversion effect as compared to curve A.

From the foregoing it will be apparent that FIG. 2B shows a case of constant magnetization along the optical path and thus curve A (FIG. 2A) shows that this results in very low conversion efficiency. FIG. 2C represents the magnetization along the optical path for the embodiment 4B and curve B (FIG. 2A) illustrates conversion as a function of distance along the wave guide. Finally FIG. 2D, illustrates magnetization as a function of distance for either FIGS. 4A or 4B and curve C (FIG. 2A) shows conversion as a function of distance along the wave guide for this case.

When operating as a demultiplexer, as previously explained, the total magnetic field must be switched between the direction parallel to optical path 31 and the direction parallel to optical path 30. This can be accomplished simply by alternating the variable magnetic field $H_r$ between $H_{r1}$ and $H_{r2}$. Similarly, when operating as a multiplexer, switching the variable magnetic field between $H_{r1}$ and $H_{r2}$ will alternately allow optical paths 30 and 31 to pass an optical beam to the common optical path 29. Under these circumstances, of course, analyzers 27 and 28 may be omitted and, if desired, a polarizer may be substituted therefor and a single analyzer provided adjacent the grating coupler 21.

Thus, the switching device of this invention includes three couplers, 21–23 deposited on an optical wave guide. These couplers, along with a beam splitter 24 define three optical paths, a common optical path 29 and two other optical paths 30 and 31. Both of the latter optical paths communicate with the common optical path. The switching device of this invention selectively completes an optical path between two of the couplers in response to a magnetic field. When operating as a demultiplexer, an input optical beam is provided to coupler 21 and the orientation of the magnetic field determines which of the two couplers 22 or 23 will provide an output. Preferably a polarizer is provided adjacent the coupler 21 and analyzers are provided adjacent couplers 22 and 23. When operating as a multiplexer, polarizers can be provided adjacent each of couplers 22 and 23, and an analyzer provided adjacent coupler 21. In this mode different optical beams can be provided to couplers 22 and 23 and the one beam which is coupled through the analyzer adjacent coupler 21 will be determined by the orientation of the magnetic field.

What is claimed is:

1. A switching device having three optical couplers and at least one polarization sensitive means, wherein said polarization sensitive means is adjacent one of said couplers for selectively completing an optical path between one of said couplers and said polarization sensitive means in response to variations in a magnetic field comprising,
   a thin-film optical wave guide with major dimensions lying in a plane and supported on a substrate, said waveguide including a common optical path adjacent one of said couplers,
   means for establishing a pair of optical paths substantially perpendicular to each other in said plane, each associated with a different one of said couplers and communicating with said common optical path,
   means for establishing a variable magnetic field in said plane directed at an angle to both said optical paths,
   means for periodically varying the magnetization along at least one of said pair of optical paths,
   whereby light coupled from one of said couplers is altered in polarization along one of said paths determined by said variable magnetic field so as to pass said polarization sensitive means.

2. The apparatus of claim 1 wherein said means for establishing a variable magnetic field includes,
   means for establishing a direct current magnetic field in said plane and directed at an angle to both said pair of optical paths and
   means for establishing a magnetic field in said plane directed in one of two directions perpendicular to said direct current magnetic field.

3. The apparatus of claim 1 wherein said means for establishing a direct current magnetic field comprises a permanent magnet.

4. The apparatus of claim 1 in which said means for establishing a variable magnetic field comprises a coil, the direction of the magnetic field induced by said coil varying with the direction of current through said coil.

5. A demultiplexer comprising the switching device of claim 1 for passing an optical beam input at one of said couplers, adjacent said common optical path, to one of said two remaining couplers further comprising polarizing means adjacent said input coupler and analyzing means adjacent to each of said other two couplers.

6. A multiplexer including the switching device of claim 1 for selectively completing an optical path between one of two input couplers and an output coupler, adjacent said common optical path, further including polarizing means adjacent each of said two input couplers and analyzing means adjacent said output coupler.

7. The apparatus of claim 1 wherein said means for establishing a pair of optical paths includes beam splitter means coupling said common optical path with each of said pair of optical paths.

8. The apparatus of claim 1 in which said means for periodically varying the magnetization along at least one of said optical paths includes a periodic pattern of material diffused into said waveguide in both said optical paths to inhibit magnetization in volumes including said diffused material.

9. The apparatus of claim 8 in which diffused material is silicon.

10. The apparatus of claim 1 in which said means for periodically varying the magnetization along at least one of said optical paths comprises, in each of said optical paths, a plurality of permalloy bars associated with each of said optical paths.

11. The apparatus of claim 10 in which said plurality of permalloy bars have width and spacing equal to $$\frac{\pi}{(B^{TM} - B^{TE})}$$

where $B_{TM}$ is the propagation constant of the wave guide material for transverse magnetic polarization and $B_{TE}$ is the propagation constant for the wave guide material for transverse electric polarization.

12. The apparatus of claim 11 in which said permalloy bars are deposited on said wave guide surface.

13. The apparatus of claim 11 which includes a second substrate on which said permalloy patterns are deposited, said second substrate located adjacent said wave guide with said permalloy bars between said second substrate and said wave guide surface.

* * * * *

UNITED STATES PATENT AND TRADEMARK OFFICE
CERTIFICATE OF CORRECTION

PATENT NO. : 3,990,776
DATED : November 9, 1976
INVENTOR(S) : Samuel C. Tseng et al.

It is certified that error appears in the above-identified patent and that said Letters Patent are hereby corrected as shown below:

In column 2, line 25, correct the spelling of "which".

In column 3, line 36 correct the formula as follows:

$$\frac{TM(z)}{TE(o)} = \frac{2K}{(B^{TE} - B^{TM})} \sin \left| \frac{(B^{TM} - B^{TE})}{2} \cdot z \right|$$

Signed and Sealed this thirtieth Day of August 1977

[SEAL]

Attest:

RUTH C. MASON
*Attesting Officer*

C. MARSHALL DANN
*Commissioner of Patents and Trademarks*